(12) United States Patent
Dominguez et al.

(10) Patent No.: US 11,866,525 B2
(45) Date of Patent: Jan. 9, 2024

(54) OPTICALLY BRIGHTENED LATEXES

(71) Applicant: Archroma IP GmbH, Reinach (CH)

(72) Inventors: Cristina Dominguez, Saint-Louis (FR); Damien Julien Corpet, Oslon (FR); Andrew Jackson, Muenchenstein (CH); David Atkinson, Arlesheim (CH)

(73) Assignee: Archroma IP GmbH

( * ) Notice: Subject to any disclaimer, the term of this patent is extended or adjusted under 35 U.S.C. 154(b) by 472 days.

(21) Appl. No.: 17/275,116

(22) PCT Filed: Sep. 13, 2019

(86) PCT No.: PCT/EP2019/074522
§ 371 (c)(1),
(2) Date: Mar. 10, 2021

(87) PCT Pub. No.: WO2020/053405
PCT Pub. Date: Mar. 19, 2020

(65) Prior Publication Data
US 2022/0049025 A1   Feb. 17, 2022

(30) Foreign Application Priority Data
Sep. 14, 2018   (EP) .................................... 18194527

(51) Int. Cl.
| | |
|---|---|
| *C08F 2/26* | (2006.01) |
| *C08F 2/44* | (2006.01) |
| *C08F 212/08* | (2006.01) |
| *C08F 220/16* | (2006.01) |
| *C08K 5/42* | (2006.01) |
| *C08F 220/18* | (2006.01) |
| *C08F 4/04* | (2006.01) |
| *C08F 218/08* | (2006.01) |
| *C08F 220/06* | (2006.01) |
| *C08F 220/14* | (2006.01) |
| *C08F 220/56* | (2006.01) |
| *C08F 228/02* | (2006.01) |
| *D21H 19/58* | (2006.01) |

(52) U.S. Cl.
CPC ................. *C08F 2/26* (2013.01); *C08F 2/44* (2013.01); *C08F 4/04* (2013.01); *C08F 212/08* (2013.01); *C08F 218/08* (2013.01); *C08F 220/06* (2013.01); *C08F 220/14* (2013.01); *C08F 220/1804* (2020.02); *C08F 220/56* (2013.01); *C08F 228/02* (2013.01); *C08K 5/42* (2013.01); *D21H 19/58* (2013.01)

(58) Field of Classification Search
CPC .. C08F 2/26; C08F 2/44; C08F 212/08; C08F 220/06; C08K 5/42

See application file for complete search history.

(56) References Cited

U.S. PATENT DOCUMENTS

| | | | |
|---|---|---|---|
| 6,773,549 | B1 | 8/2004 | Burkhardt |
| 9,073,818 | B2 | 7/2015 | Herrwerth et al. |
| 2002/0084049 | A1 | 7/2002 | Engelhardt et al. |
| 2006/0185808 | A1 | 8/2006 | Nguyen |
| 2007/0193707 | A1 | 8/2007 | Nguyen |
| 2011/0303872 | A1 | 12/2011 | Herfert et al. |
| 2013/0071343 | A1 | 3/2013 | Herrwerth et al. |

FOREIGN PATENT DOCUMENTS

| | | | |
|---|---|---|---|
| CN | 1211655 | A | 3/1999 |
| CN | 1659339 | A | 8/2005 |
| CN | 101048551 | A | 10/2007 |
| CN | 101253161 | A | 9/2012 |
| CN | 102959156 | A | 3/2013 |
| CN | 103732691 | A | 4/2014 |
| DE | 4138630 | A1 | 5/1993 |
| DE | 102008015899 | A1 | 10/2008 |
| DE | 102010029606 | A1 | 12/2011 |
| DE | 102010029610 | A1 | 12/2011 |
| EP | 0884312 | A1 | 12/1998 |
| EP | 0899373 | A1 | 3/1999 |
| EP | 2198827 | A2 | 6/2010 |
| EP | 2783677 | A2 | 10/2014 |
| FR | 2862210 | A1 | 5/2005 |
| JP | S52-37946 | A | 3/1977 |
| JP | 2004-331845 | A | 11/2004 |
| JP | 2008-518068 | A | 5/2008 |
| RU | 2253711 | C2 | 6/2005 |
| RU | 2418904 | C2 | 5/2011 |
| RU | 2564310 | C2 | 9/2015 |
| WO | 02055646 | A1 | 7/2002 |
| WO | 03104560 | A1 | 12/2003 |
| WO | 2006045714 | A1 | 5/2006 |
| WO | 2006061399 | A2 | 6/2006 |
| WO | 2007017336 | A1 | 2/2007 |
| WO | 2007143182 | A2 | 12/2007 |
| WO | 2012010326 | A1 | 1/2012 |
| WO | 2013020693 | A1 | 2/2013 |
| WO | WO-2013020693 | A1 * | 2/2013 ........... C09B 23/148 |
| WO | 2016142955 | A1 | 9/2016 |
| WO | 2017021444 | A1 | 2/2017 |

* cited by examiner

OTHER PUBLICATIONS

International Search Report for Application No. PCT/EP2019/074522 dated Oct. 29, 2019.

*Primary Examiner* — Deve V Hall

(57) ABSTRACT

The present invention relates to a method of preparing an aqueous composition by emulsion polymerization of at least one ethylenically unsaturated monomer in the presence of at least one water-soluble diaminostilbene disulphonic optical brightener, as well as to the aqueous composition obtainable by said method, the use of said aqueous composition for optically brightening of a cellulosic substrate and the cellulosic substrate treated with the aqueous composition.

15 Claims, No Drawings

OPTICALLY BRIGHTENED LATEXES

CROSS-REFERENCE TO RELATED APPLICATIONS

This application is the National Stage entry of International Application No. PCT/EP2019/074522, filed 13 Sep. 2019, which claims priority to European Patent Application No. 18194527.0, filed 14 Sep. 2018.

BACKGROUND

Field

Field of the Invention

The present invention relates to a method of preparing an aqueous composition by emulsion polymerization of at least one ethylenically unsaturated monomer in the presence of at least one water-soluble diaminostilbene disulphonic optical brightener, as well as to the aqueous composition obtainable by said method, the use of said aqueous composition for optically brightening of a cellulosic substrate and the cellulosic substrate treated with the aqueous composition.

Description of Related Art

Surface treatment of paper or board with a pigmented coating composition is practiced in order to improve surface properties such as brightness, smoothness, gloss, opacity and printability. Coating compositions are aqueous dispersions in which the total solids content is typically in the range of 50-70%, of which 80-90% comprises one or more pigments, such as kaolin clay or calcium carbonate. The pigment particles are fixed to the paper surface and to each other by a binder which can be natural, such as starch, or synthetic, such as an acrylate, styrene-acrylate or styrene-butadiene latex. The coating composition also contains various additives such as colorants, optical brighteners, insolubilizers, plasticizers, rheology modifiers, dispersants, preservatives and defoamers.

The increase in production speed of coated papers to up to 3,000 m/min or even more has driven the move from natural binders to synthetic latexes capable of delivering a high solids' content while maintaining a low viscosity.

It is a requirement of the industry that the synthetic latex is supplied in the form of a water-based emulsion which can be applied directly to paper.

The preference of the consumer for coated papers of higher whiteness and brightness has led papermakers to blend optical brighteners into the pigmented coating composition.

The optical brighteners preferred by the industry are those of the water-soluble diaminostilbene disulphonic type because of their substantivity and affinity for cellulosic fiber, their safety in use, and their low application cost.

The use of optical brighteners in coated papers is limited however by a number of factors. One problem to be solved is that the optical brightener bleeds out of the coated paper over time through the action of solvents, leading to an apparent yellowing of the paper. A second problem to be solved is that only a limited whiteness gain is possible before the coating becomes 'saturated' with optical brightener and the paper begin to take on a greenish aspect. This second problem can be overcome at present only be introducing large concentrations of a so-called 'carrier' into the coating composition. Examples of suitable carriers include polyethylene glycol and polyvinyl alcohol.

One approach to solving the problem of bleedfastness has been to include a water-insoluble optical brightener during the emulsion polymerization process. Such optical brighteners are expensive, and neither readily-available nor accepted for use by the industry in the volumes required. Furthermore, they provide no solution to the problem of the low whiteness ceiling.

A second approach to solving the problem of bleedfastness has been to co-polymerize an ethylenically unsaturated monomer with an acrylic-, methacrylic- or allylic-substituted diaminostilbene disulphonic optical brightener. No disclosures have been made of the preparation of an emulsion that could be used by the industry. Acrylic-, methacrylic- and allylic-substituted diaminostilbene disulphonics are also expensive to produce and have an untested toxicological profile. Furthermore, no claim has been made of 100% retention of the optical brightener within the polymer.

OBJECTS OF THE INVENTION

There remains a need for water-based latex binders which are readily-made as an emulsion, resistant to bleed, capable of providing a higher whiteness ceiling without the use of carriers, toxicologically-proven and economic in use.

SUMMARY OF THE INVENTION

The object is solved by a method for the preparation of an aqueous composition, preferably of a water-based latex binder, by emulsion polymerization of at least one ethylenically unsaturated monomer in the presence of at least one water-soluble diaminostilbene disulphonic optical brightener of formula (1)

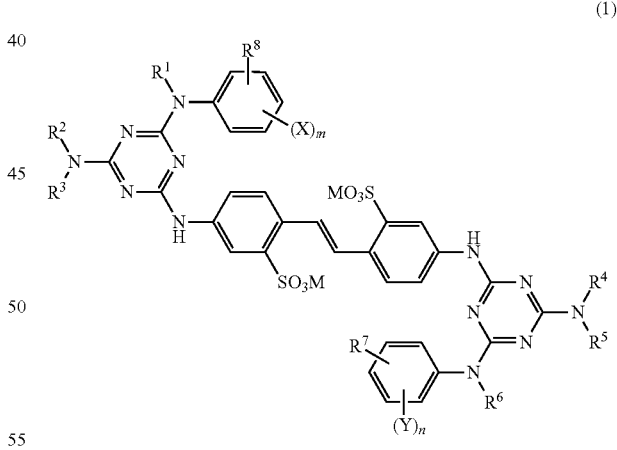

in which
  $R^1$ and $R^6$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$,
  $R^2$ and $R^4$ signify independently from each other hydrogen, linear or branched $C_1$ to $C_4$ alkyl, linear or branched $C_1$ to $C_4$ hydroxyalkyl, $CH_2CO_2M$, $CH_2CH_2CONH_2$ or $CH_2CH_2CN$,
  $R^3$ and $R^5$ signify independently from each other linear or branched $C_1$ to $C_4$ alkyl, linear or branched $C_1$ to $C_4$ hydroxyalkyl, $CH_2CO_2M$, $CH(CO_2M)CH_2CO_2M$, $CH(CO_2M)CH_2CH_2CO_2M$, benzyl or $R^2$ and $R^3$ signify together with their neighbouring nitrogen atom a morpholino ring and/or $R^4$ and $R^5$ signify together with their neighbouring nitrogen atom a morpholino ring, $R^7$ and $R^8$ signify independently from each other hydrogen, linear or branched $C_1$ to $C_4$ alkyl X and Y signify independently from each other $CO_2M$ or $SO_3M$, n and m signify independently from each other an integer selected from 0, 1 or 2, and M signifies at least one cation for balancing the anionic charge of the optical brightener and is selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

Preferably, in the method according to the invention, in the at least one water-soluble diaminostilbene disulphonic optical brightener of formula (1)

$R^1$ and $R^6$ signify independently from each other hydrogen, methyl, linear or branched $C_1$ to $C_4$ hydroxyalkyl or $CH_2CH_2CONH_2$, $R^2$ and $R^4$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$, $R^3$ and $R^5$ signify independently from each other linear or branched $C_1$ to $C_4$ alkyl, linear or branched $C_1$ to $C_4$ hydroxyalkyl, $CH(CO_2M)CH_2CO_2M$, $CH(CO_2M)CH_2CH_2CO_2M$, benzyl or $R^2$ and $R^3$ signify together with their neighbouring nitrogen atom a morpholino ring and/or $R^4$ and $R^5$ signify together with their neighbouring nitrogen atom a morpholino ring, and $R^7$ and $R^8$ signify independently from each other hydrogen or methyl, and M signifies at least one cation as defined in before.

Preferably, in the method according to the invention, in the at least one water-soluble diaminostilbene disulphonic optical brightener of formula (1)

$R^1$ and $R^6$ signify hydrogen, $R^2$ and $R^4$ signify independently from each other hydrogen, linear or branched $C_1$ to $C_2$ alkyl, linear or branched $C_1$ to $C_3$ hydroxyalkyl, $R^3$ and $R^5$ signify independently from each other linear or branched $C_1$ to $C_2$ alkyl, linear or branched $C_1$ to $C_3$ hydroxyalkyl, $CH(CO_2M)CH_2CO_2M$, $CH(CO_2M)CH_2CH_2CO_2M$, or $R^2$ and $R^3$ signify together with their neighbouring nitrogen atom a morpholino ring and/or $R^4$ and $R^5$ signify together with their neighbouring nitrogen atom a morpholino ring, and $R^7$ and $R^8$ signify independently from each other hydrogen or methyl, and M signifies at least one cation as defined before.

Preferably, in the method according to the invention, the at least one ethylenically unsaturated monomer is selected from (a) $C_1$- to $C_{18}$-alkyl esters of (meth)acrylic acid, vinyl acetate, vinyl propionate, vinyl butyrate, vinyl versatates, styrene and α-methylstyrene; (b) hydrophilic monomers such as (meth)acrylic acid, itaconic acid, vinylsulphonic acid, $C_1$- to $C_8$-hydroxyalkylesters of $C_1$- to $C_6$-carboxylic acids, (meth)acrylamide, N-methylol(meth)acrylamide, (meth)acrylonitrile, N-vinylformamide and N-vinylpyrrolidone; or (c) crosslinking agents which have two or more ethylenically-unsaturated double bonds such as ethylene glycol di(meth)acrylate, butanediol di(meth)acrylate, hexanediol di(meth)acrylate, divinylbenzene and trivinylbenzene; or a mixture of two or more thereof.

Preferably, in the method according to the invention, the at least one ethylenically unsaturated monomer is selected from (a) $C_1$- to $C_6$-alkyl esters of (meth)acrylic acid, vinyl acetate, vinyl propionate and styrene; (b) hydrophilic monomers such as (meth)acrylic acid, vinylsulphonic acid, (meth)acrylamide and (meth)acrylonitrile; or a mixture of two or more thereof.

Preferably, in the method according to the invention, the at least one ethylenically unsaturated monomer is selected from (a) methyl methacrylate, butyl acrylate, vinyl acetate and styrene; (b) hydrophilic monomers such as (meth)acrylic acid, vinylsulphonic acid and acrylamide; or a mixture of two or more thereof.

Preferably, in the method according to the invention, the emulsion polymerization is initiated by a water-soluble azo compound of formula (2) and/or formula (3)

$$\text{(2)}$$

$$\text{(3)}$$

in which

X and Y signify independently from each other O or NH,

R and R' signify independently from each other hydrogen, or linear or branched $C_1$-$C_4$ alkyl substituted with one or more hydroxyl, $CO_3M^1$ or $CO_3M^2$ groups, wherein $M^1$ and $M^2$ signify at least one cation for balancing the anionic charge of the azo compound of formula (3) and are independently from each other selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

Preferably, in the method according to the invention, the emulsion polymerization comprises at least the following four steps (a) to (d):

a) providing an aqueous solution comprising or consisting of the at least one water-soluble diaminostilbene disulphonic optical brightener of formula (1), and optionally at least one dispersing agent and b) providing a homogeneous pre-dispersion, wherein the pre-dispersion comprises or consists of the at least one ethylenically unsaturated monomer, water and at least one dispersing agent, and c) providing an aqueous solution comprising or consisting of a water-soluble azo compound of formula (2) and/or formula (3), and d) adding the pre-dispersion obtained in step (b) and the aqueous solution obtained in step (c) concurrently to the aqueous solution obtained in step (a).

The object is further solved by an aqueous composition obtainable by the method for the preparation of an aqueous composition according to the invention, preferably of a water-based latex binder, by emulsion polymerization of at least one ethylenically unsaturated monomer in the presence of at least one water-soluble diaminostilbene disulphonic optical brightener of formula (1)

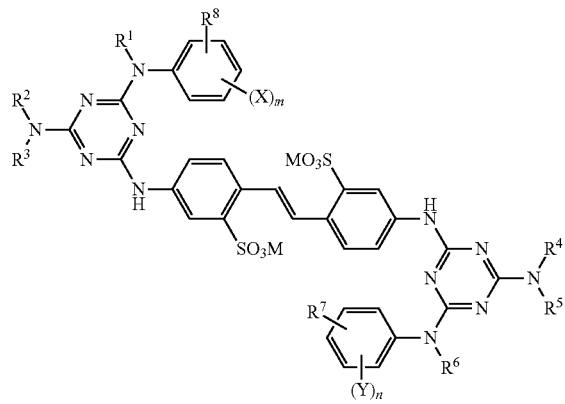

(1)

in which

R$^1$ and R$^6$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$, R$^2$ and R$^4$ signify independently from each other hydrogen, linear or branched $C_1$ to $C_4$ alkyl, linear or branched $C_1$ to $C_4$ hydroxyalkyl, $CH_2CO_2M$, $CH_2CH_2CONH_2$ or $CH_2CH_2CN$, R$^3$ and R$^5$ signify independently from each other linear or branched $C_1$ to $C_4$ alkyl, linear or branched $C_1$ to $C_4$ hydroxyalkyl, $CH_2CO_2M$, $CH(CO_2M)CH_2CO_2M$, $CH(CO_2M)CH_2CH_2CO_2M$, benzyl or R$^2$ and R$^3$ signify together with their neighbouring nitrogen atom a morpholino ring and/or R$^4$ and R$^5$ signify together with their neighbouring nitrogen atom a morpholino ring, R$^7$ and R$^8$ signify independently from each other hydrogen, linear or branched $C_1$ to $C_4$ alkyl X and Y signify independently from each other $CO_2M$ or $SO_3M$, n and m signify independently from each other an integer selected from 0, 1 or 2, and M signifies at least one cation for balancing the anionic charge of the optical brightener and is selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetra- substituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

Preferably, in the aqueous composition according to the invention at least one further additive is present in the aqueous composition, wherein the additive is selected from, one or more biocides, one or more defoamers, one or more preservatives, one or more antifreezers, one or more thickeners, or mixtures thereof.

Preferably, in the aqueous composition according to the invention, more than 90% by weight, or more than 92% by weight, or more than 94% by weight, or more than 96% by weight, or more than 98% by weight, or more than 99% by weight of the OBA of formula (1) are entrapped within the polymer wherein the weight % are based on the total amount of OBA of formula (1) present in the aqueous composition.

Another aspect of the invention relates to the use of the aqueous composition according to the invention for optically brightening of a cellulosic substrate, preferably wherein the aqueous composition is used in a coating composition.

A further aspect of the present invention relates to the coating composition comprising at least the aqueous composition according to the invention.

Another aspect of the present invention relates to a process for optical brightening of a cellulosic substrate comprising the steps of i) applying the aqueous composition according to the invention or the coating composition according to the invention to the cellulosic substrate, and ii) drying the cellulosic substrate.

Another aspect of the invention relates to the cellulosic substrate treated with the aqueous composition according to the invention or the coating composition according to the invention.

DETAILED DESCRIPTION OF A PREFERRED EMBODIMENT

The method according to the invention has the advantage to obtain an aqueous composition according to the invention comprising at least one water-soluble diaminostilbene disulphonic optical brightener of formula (1).

The term "aqueous composition" as used within the context of the present application refers to a water-based composition, i.e. the composition comprises water. Further, the aqueous composition according to the invention is designed as a polymer dispersion in which non-polymerizable, water-soluble diaminostilbene disulphonic optical brightener of formula (1) is entrapped.

In this respect it is referred to the herein provided Example 1 in the example section wherein it is disclosed on how to determine the amount of free, i.e. not entrapped non-polymerizable, water-soluble diaminostilbene disulphonic optical brightener of formula (1).

The aqueous composition according to the invention has the advantage that if applied to a substrate surface, e.g. to the surface of a cellulosic substrate, either in form of the aqueous composition according to the invention, or in form of e.g. a coating composition, with a subsequent drying step, then a coating is formed on the substrate surface in which the non-polymerizable, water-soluble diaminostilbene disulphonic optical brightener of formula (1) is still entrapped within the polymer matrix, and is not released to the environment, i.e. shows bleedfastness. A further advantage is that the substrate surface so-treated shows a high whiteness ceiling, while not requiring the presence of a secondary binder or carrier.

The term "entrapped" as used within the context of the present application refers to molecules of OBA of formula (1) which are distributed within the polymer or polymer dispersion and therefore not detectable according to the method described in Example 1. In contrast thereto, the amount of free OBA of formula (1) present in the aqueous composition according to the invention can be determined according to the method described in Example 1.

Preferably, the amount of free OBA according to formula (1) present in the aqueous composition according to the invention is below 10% by weight, or below 8% by weight, or below 6% by weight, or below 4% by weight, or below 2% by weight, or below the detection limit of the method described in Example 1, i.e. below 1% by weight, wherein the weight % are based on the total amount of OBA of formula (1) present in the aqueous composition according to the invention. Considering it the other way round, more than 90% by weight, or more than 92% by weight, or more than 94% by weight, or more than 96% by weight, or more than 98% by weight, or more than 99% by weight of the OBA of formula (1) are entrapped wherein the weight % are based on the total amount of OBA of formula (1) present in the aqueous composition according to the invention.

Preferably the aqueous composition according to the invention is designed as water-based latex binder.

The term "optical brightener" within the context of the present application can be interchangeably used with the terms OBA, or optical brightening agent, or brightening agent, or fluorescent whitening agent, or FWA, or fluorescent brightening agent or FBA and refers to a compound of general formula (1) having a diaminostilbene disulphonic moiety:

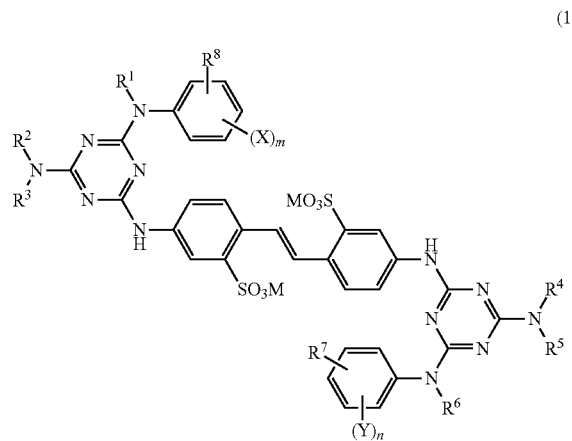

in which
R$^1$ and R$^6$ signify independently from each other hydrogen, linear or branched C$_1$ to C$_4$ alkyl, linear or branched C$_1$ to C$_4$ hydroxyalkyl, CH$_2$CH$_2$CONH$_2$ or CH$_2$CH$_2$CN,
R$^2$ and R$^4$ signify independently from each other hydrogen, linear or branched C$_1$ to C$_4$ alkyl, linear or branched C$_1$ to C$_4$ hydroxyalkyl, CH$_2$CO$_2$M, CH$_2$CH$_2$CONH$_2$ or CH$_2$CH$_2$CN,
R$^3$ and R$^5$ signify independently from each other linear or branched C$_1$ to C$_4$ alkyl, linear or branched C$_1$ to C$_4$ hydroxyalkyl, CH$_2$CO$_2$M, CH(CO$_2$M)CH$_2$CO$_2$M, CH(CO$_2$M)CH$_2$CH$_2$CO$_2$M, benzyl or
R$^2$ and R$^3$ signify together with their neighbouring nitrogen atom a morpholino ring and/or
R$^4$ and R$^5$ signify together with their neighbouring nitrogen atom a morpholino ring,
R$^7$ and R$^8$ signify independently from each other hydrogen, linear or branched C$_1$ to C$_4$ alkyl
X and Y signify independently from each other CO$_2$M or SO$_3$M,
n and m signify independently from each other an integer selected from 0, 1 or 2, and
M signifies at least one cation for balancing the anionic charge of the optical brightener and is selected from the group comprising or essentially consisting of hydrogen, an alkali metal cation, an alkaline earth metal cation, ammonium, ammonium which is mono-, di-, tri- or tetrasubstituted by a C$_1$ to C$_4$ linear or branched alkyl radical, ammonium which is mono-, di-, tri- or tetrasubstituted by a C$_1$ to C$_4$ linear or branched hydroxyalkyl radical, ammonium which is di-, tri-, or tetrasubstituted by a mixture of C$_1$ to C$_4$ linear or branched alkyl radical or C$_1$ to C$_4$ linear or branched hydroxyalkyl radical or mixtures of said cations.

The OBA according to formula (1) as used in the aqueous composition according to the invention has the advantage of being easily and essentially completely soluble in water and thus forming an aqueous solution. Therefore, the OBA of formula (1) as used in the aqueous composition according to the invention is to be regarded as "water-soluble".

Further, the OBA of formula (1) as used in the aqueous composition according to the invention is to be regarded as anionic optical brightener due to the presence of anionic groups, particularly of SO$_3^-$ and/or CO$_2^-$ groups introducing the anionic charge into the OBA molecule. The OBA of formula (1) is i.a. water-soluble due to the presence of anionic groups, particularly SO$_3^-$ and/or CO$_2^-$ groups.

The optical brightener of formula (1) has to be distinguished from cationic OBAs or neutral OBAs. In contrast to the OBA of formula (1) as used in the aqueous composition according to the invention, cationic OBAs or neutral OBAs show low, or even no water solubility. Under the term "cationic OBAs" OBAs are to be understood wherein a cationic charge is located on the OBA molecule. Under the term "neutral OBAs" OBAs are to be understood, wherein no charge is present in the OBA molecule at all. Examples of such OBAs are stilbenes, benzoxazoles, coumarins, pyrenes and naphthalenes.

Preferably, in the aqueous composition according to the invention, the presence of one or more cationic and/or neutral OBAs is excluded.

Further, the OBA of formula (1) as used in the aqueous composition according to the invention is non-polymerizable, i.e. does not contain any ethylenically unsaturated residues. In this respect it is referred to the definitions given herein for the residues R$^1$ to R$^8$, X and Y present in the OBA of formula (1).

Preferably, in the aqueous composition according to the invention, the presence of one or more OBAs containing ethylenically unsaturated residues is excluded.

Further preferably, in the aqueous composition according to the invention, the presence of one or more OBAs containing ethylenically unsaturated residues and the presence of one or more cationic and/or neutral OBAs is excluded.

Preferred water-soluble diaminostilbene disulphonic optical brighteners of formula (1) are those in which $R^1$ and $R^6$ signify independently from each other hydrogen, methyl, linear or branched $C_1$ to $C_4$ hydroxyalkyl or $CH_2CH_2CONH_2$, $R^2$ and $R^4$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$, $R^3$ and $R^5$ signify independently from each other linear or branched $C_1$ to $C_4$ alkyl, linear or branched $C_1$ to $C_4$ hydroxyalkyl, $CH(CO_2M)CH_2CO_2M$, $CH(CO_2M)CH_2CH_2CO_2M$, benzyl or $R^2$ and $R^3$ signify together with their neighbouring nitrogen atom a morpholino ring and/or $R^4$ and $R^5$ signify together with their neighbouring nitrogen atom a morpholino ring, and $R^7$ and $R^8$ signify independently from each other hydrogen or methyl, and M signifies at least one cation for balancing the anionic charge of the optical brightener and is selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

Most preferred water-soluble diaminostilbene disulphonic optical brightener of formula (1) are those in which $R^1$ and $R^6$ signify hydrogen, $R^2$ and $R^4$ signify independently from each other hydrogen, linear or branched $C_1$ to $C_2$ alkyl, linear or branched $C_1$ to $C_3$ hydroxyalkyl, $R^3$ and $R^5$ signify independently from each other linear or branched $C_1$ to $C_2$ alkyl, linear or branched $C_1$ to $C_3$ hydroxyalkyl, $CH(CO_2M)CH_2CO_2M$, $CH(CO_2M)CH_2CH_2CO_2M$, or $R^2$ and $R^3$ signify together with their neighbouring nitrogen atom a morpholino ring and/or $R^4$ and $R^5$ signify together with their neighbouring nitrogen atom a morpholino ring, and $R^7$ and $R^8$ signify independently from each other hydrogen or methyl, and M signifies at least one cation for balancing the anionic charge of the optical brightener and is selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

The aqueous composition according to the invention can comprise one or more water-soluble diaminostilbene disulphonic optical brightener of formula (1).

The aqueous composition according to the invention further comprises a polymer dispersion. The polymer dispersion is derived from the polymerization of at least one ethylenically unsaturated monomer, which takes place during the method according to the invention. The term "polymer dispersion" refers to a dispersion of at least one polymer in aqueous medium, preferably water, wherein a visible inspection of the dispersion with the human eye does only show one single phase. Therefore, the polymer dispersion might also be regarded as emulsion.

The polymer dispersion can be designed as homopolymer dispersion which means that only one kind of ethylenically unsaturated monomer is used during the emulsion polymerization according to the method according to the invention. The polymer dispersion can be also designed as copolymer dispersion. The term "copolymer" signifies a polymer wherein in the polymerization thereof at least two ethylenically unsaturated monomers are used, wherein the at least two monomers are different from one another. For example, the monomers have different molecular formulas.

The at least one ethylenically unsaturated monomer is selected from (a) $C_1$- to $C_{18}$-alkyl esters of (meth)acrylic acid, vinyl acetate, vinyl propionate, vinyl butyrate, vinyl versatates, styrene and α-methylstyrene; (b) hydrophilic monomers such as (meth)acrylic acid, itaconic acid, vinylsulphonic acid, $C_1$- to $C_8$-hydroxyalkylesters of $C_1$- to $C_6$-carboxylic acids, (meth)acrylamide, N-methylol(meth)acrylamide, (meth)acrylonitrile, N-vinylformamide and N-vinylpyrrolidone.

Preferred ethylenically unsaturated monomers are selected from $C_1$- to $C_6$-alkyl esters of (meth)acrylic acid, vinyl acetate, vinyl propionate and styrene; (b) hydrophilic monomers such as (meth)acrylic acid, vinylsulphonic acid, (meth)acrylamide and (meth)acrylonitrile.

Most preferred ethylenically unsaturated monomers are selected from (a) methyl methacrylate, butyl acrylate, vinyl acetate and styrene; (b) hydrophilic monomers such as (meth)acrylic acid, vinylsulphonic acid and acrylamide.

Other suitable monomers that may be included are cross-linking agents (c) which have two or more ethylenically-unsaturated double bonds such as ethylene glycol di(meth)acrylate, butanediol di(meth)acrylate, hexanediol di(meth)acrylate, divinylbenzene and trivinylbenzene.

As used herein, the term "(meth)acrylate" denotes both "acrylate" and "methacrylate", and the term "(meth)acrylic" denotes both "acrylic" and "methacrylic".

The aqueous composition according to the invention comprises the product resulting from an emulsion polymerization of at least one ethylenically unsaturated monomer in the presence of at least one water-soluble diaminostilbene disulphonic optical brightener of formula (1). Further, the aqueous composition according to the invention can comprise at least one dispersing agent and/or residues of the water-soluble azo compound of formula (2) and/or formula (3).

The water-soluble azo compound of formula (2) and/or formula (3) is used as radical initiator during the method according to the invention:

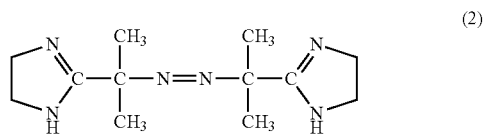

(2)

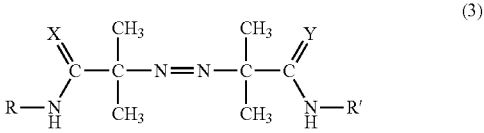

(3)

in which

X and Y are independently from each other 0 or NH, R and R' signify independently from each other hydrogen, or linear or branched $C_1$-$C_4$ alkyl substituted with one or more hydroxyl, $CO_2M^1$ or $SO_3M^2$ groups, wherein $M^1$ and $M^2$ signify at least one cation for balancing the anionic charge of the azo compound of formula (3) and are independently from each other selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

The use of the water-soluble azo compounds of formula (2) and formula (3) in the method according to the invention, i.e. for initiating the emulsion polymerization has the advantage to obtain the aqueous composition according to the invention. Further, the use of the water-soluble azo compounds of formula (2) and formula (3) in the method according to the invention has the advantage that the amount of reaction mass after the emulsion polymerization which is present in the form of grits and thus unusable is below 10 wt %, or below 8 wt %, or below 6 wt %, or below 4 wt %, or below 2 wt %, or below 1 wt %, wherein the wt % are based on the total mass of the reaction mixture.

The azo compounds of formula (2) and formula (3) are commonly known radical initiators and can be obtained e.g. from Wako Chemicals.

Under the term "dispersing agent" as used within the context of the present application, an agent is to be understood facilitating the dispersion of one or more components in a dispersion medium. In the method according to the invention, at least one dispersing agent is i.a. used in order to form a pre-dispersion of water and at least one ethylenically unsaturated monomer. Anionic and nonionic dispersing agents are preferred.

Suitable anionic dispersing agents include, for example, alkali fatty alcohol sulfates, such as sodium lauryl sulfate; arylalkyl sultanates, such as potassium isopropylbenzene sultanate; alkali alkyl sulfosuccinates, such as sodium octyl sulfosuccinate; and alkali arylalkylpolyethoxyethanol sulfates or sultanates, such as sodium t-octylphenoxypolyethoxyethyl sulfate, having 1 to 30 oxyethylene units.

Suitable nonionic dispersing agents include, for example, alkyl phenoxypolyethoxyethanols, having alkyl groups of from 7 to 18 carbon atoms and from 6 to 60 oxyethylene units such as for example, heptyl phenoxypolyethoxyethanols; ethylene oxide derivatives of long chained carboxylic acids such as lauric acid, myristic acid, palmitic acid, oleic acid or mixtures of acids such as those found in tall oil containing from 6 to 60 oxyethylene units; ethylene oxide condensates of long chained alcohols such as octyl, decyl, lauryl or cetyl alcohols containing from 6 to 60 oxyethylene units; ethylene oxide condensates of long-chain or branched chain amines such as dodecyl amine, hexadecylamine, and octadecyl amine, containing from 6 to 60 oxyethylene units; and block copolymers of ethylene oxide sections combined with one or more hydrophobic propylene oxide sections.

High molecular weight polymers such as starch, hydroxyethyl cellulose, methyl cellulose, polyacrylic acid, polyvinyl alcohol, may be used as dispersion stabilizers and protective colloids.

The term "pre-dispersion" refers to a dispersion of at least one ethylenically unsaturated monomer in aqueous medium, preferably water, wherein a visible inspection of the dispersion with the human eye does only show one single phase. Thus, the at least one ethylenically unsaturated monomer is dispersed homogeneously in the aqueous medium. The homogeneous dispersion of the at least one ethylenically unsaturated monomer is preferably achieved by using at least one dispersing agent.

The aqueous composition according to the invention can further comprise at least one further additive selected from one or more biocides, one or more defoamers, one or more preservatives, one or more antifreezers, one or more thickeners, or mixtures thereof.

Examples of suitable biocides which can be used in the composition according to the invention are available under the trade names Acticide® and Nipacide®.

Preferably the aqueous composition according to the invention is essentially free, preferably completely free from precipitated and/or coagulated polymer particles or OBA particles.

The aqueous composition according to the invention has further the advantage of being stable, e.g. towards electrolytes, temperature effects or shear forces.

The aqueous composition according to the invention is prepared by the method according to the invention by emulsion polymerization of at least one ethylenically unsaturated polymer in the presence of at least one water-soluble diaminostilbene disulphonic optical brightener of formula (1).

The term "emulsion polymerization" as used within the context of the present application refers to a polymerization wherein water-insoluble monomers are dispersed in water under the aid of dispersing agents, like lauryl sulfate, and the polymerization is initiated by using radical initiators, preferably the water-soluble azo compounds of formula (2) and (3).

The advantage of using an emulsion polymerization in the method according to the invention is that the thereby obtainable aqueous composition according to the invention is immediately usable, i.e. the thus obtained aqueous composition can be packed for sale or storage with or without a previous purification step or directly employed in e.g. a coating composition with or without a previous purification step.

The emulsion polymerization in the method according to the invention comprises at least the following four steps: (a) providing an aqueous solution comprising or consisting of the at least one water-soluble diaminostilbene optical brightener of formula (1), and optionally at least one dispersing agent, and (b) providing a homogeneous pre-dispersion, wherein the pre-dispersion comprises or consists of the at least one ethylenically unsaturated monomer, water and at least one dispersing agent, and (c) providing an aqueous solution comprising or consisting of a water-soluble azo compound of formula (2) and/or formula (3), and (d) adding the pre-dispersion obtained in step (b) and the aqueous solution obtained in step (c) concurrently to the aqueous solution obtained in step (a).

The term "aqueous solution" as used in the context of the present application refers to a liquid medium, which is water, in which one or more components, e.g. the OBA of formula (1) or the azo compounds according to formula (2) or formula (3) are essentially completely dissolved in the liquid, i.e. no particles of the one or more components are present in the aqueous solution.

In the method according to the invention, steps (a) to (c) can be conducted in any order. It is also possible to conduct steps (a) to (c) concurrently.

In step (d) in the method according to the invention, the pre-dispersion obtained in step (b) and the aqueous solution obtained in step (c) are added to the aqueous solution obtained in step (a) under stirring at between 50 and 200 rpm. The pre-dispersion obtained in step (b) and the aqueous solution obtained in step (c) are added concurrently over a period of 1 to 10 hours, preferably over a period of 2 to 6 hours.

The emulsion polymerization is preferably started by applying heat. The applied heat has to be high enough in order to cause the radical initiator, i.e. the azo compound of formula (2) and/or formula (3) to split off nitrogen, thus forming the organic radical. A suitable temperature range is 55 to 95° C., preferably 75 to 95° C. Preferably, the aqueous solution obtained in step (a) is heated up to the desired temperature prior to adding the pre-dispersion obtained in step (b) and the aqueous solution obtained in step (c). The temperature should be maintained during the addition of the pre-dispersion obtained in step (b) and the aqueous solution obtained in step (c).

After the addition of the pre-dispersion obtained in step (b) and the aqueous solution obtained in step (c) to the aqueous solution obtained in step (a) is finished, the thus obtained reaction mixture can be either further maintained at the desired temperature for a certain further time period, or the reaction mixture can be allowed to cool down e.g. to room temperature.

The method according to the invention can further comprise one or more purification steps following the emulsion polymerization. For example, one purification step can be conducted after the emulsion polymerization is completed by removing solids e.g. grits of reaction mass via filtration from the reaction mixture.

In reaction A, a compound of formula (10) is reacted with a compound of formula (11) to result in a compound of formula (12)

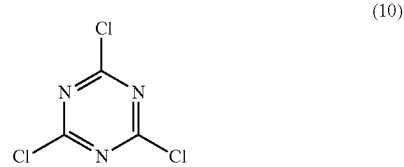

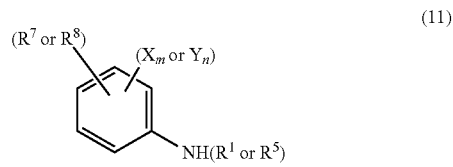

In reaction B, the compound of formula (12), obtained in reaction A, is reacted with a compound of formula (13) to result in a compound of formula (14)

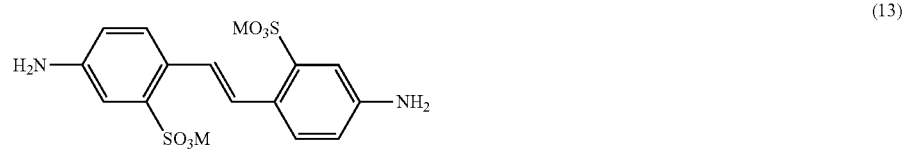

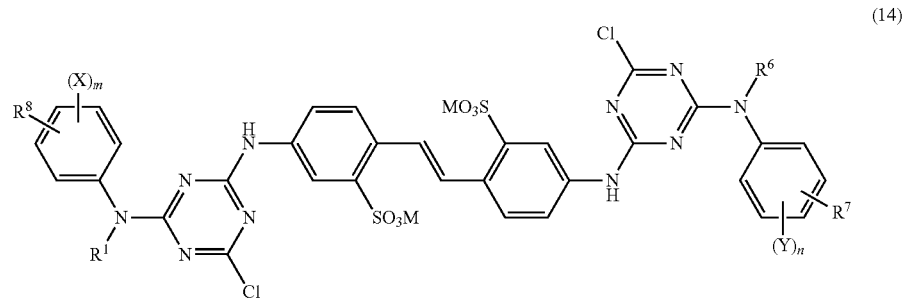

The OBA of formula (1) is obtained by preparation methods which are commonly known by the skilled person and described in the prior art. The following preparation method is one example for a method to obtain the OBA of formula (1).

The method to obtain the OBA of formula (1) comprises a reaction A, which is followed by a reaction B, which is followed by a reaction C. The subsequently described preparation method can be applied to every OBA which falls within the general formula (1).

Alternatively, a compound of formula (14) is prepared by reacting a compound of formula (10) first with a compound of formula (13), followed by a reaction with a compound of formula (11).

In reaction C, the compound of formula (14) obtained in reaction B is reacted with a compound of formula (15) and a compound of formula (16) to result in an aqueous composition comprising the compound of formula (I) and diethanolamine.

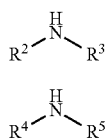

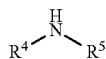

In formulae (10) to (16) $R^1$ and $R^6$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$, $R^2$ and $R^4$ signify independently from each other hydrogen, linear or branched $C_1$ to $C_4$ alkyl, linear or branched $C_1$ to $C_4$ hydroxyalkyl, $CH_2CO_2M$, $CH_2CH_2CONH_2$ or $CH_2CH_2CN$, $R^3$ and $R^5$ signify independently from each other linear or branched $C_1$ to $C_4$ alkyl, linear or branched $C_1$ to $C_4$ hydroxyalkyl, $CH_2CO_2M$, $CH(CO_2M)CH_2CO_2M$, $CH(CO_2M)CH_2CH_2CO_2M$, benzyl or $R^2$ and $R^3$ signify together with their neighbouring nitrogen atom a morpholino ring and/or $R^4$ and $R^5$ signify together with their neighbouring nitrogen atom a morpholino ring, $R^7$ and $R^8$ signify independently from each other linear or branched $C_1$ to $C_4$ alkyl, X and Y signify independently from each other $CO_2M$ or $SO_3M$, n and m are 0, 1 or 2, and M signifies a cation for balancing the anionic charge of the optical brightener selected from the group comprising or essentially consisting of hydrogen, an alkali metal cation, alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

Each reaction A, B and C is preferably carried out in water or in a mixture of water and non-aqueous organic solvent. Preferably, the compound of formula (10) is suspended in water, or the compound of formula (10) is dissolved in a solvent like acetone. Preferably, the compound of formula (10) is used as a suspension in water.

Each compound of formula (10), (13), (15) or (16) may be used with or without dilution, in case of dilution the compounds of formula (10), (13), (15) or (16) are preferably used in the form of an aqueous solution or suspension.

Preferably, the compound of formula (10) is reacted in 0 to 10 mol-% excess with respect to compound of formula (11). One mol equivalent of compound of formula (13) is reacted with two mol equivalents of compound of formula (12) preferably in 0 to 10 mol-% excess with respect to compound of formula (12). The compound of formula (15) and the compound of formula (16) are reacted with one mol equivalent of compound of formula (14), preferably compounds of formulae (15) and (16) are together reacted in 0 to 30 mol-% excess with respect to compound of formula (14).

Preferably, any reaction A, B and C is done between atmospheric pressure and 10 bar, more preferably under atmospheric pressure.

In reaction A, the reaction temperature is preferably of from −10 to 20° C. In reaction B, the reaction temperature is preferably of from 20 to 80° C. In reaction C, the reaction temperature is preferably of from 60 to 102° C.

Reaction A is preferably carried out under acidic to neutral pH conditions, more preferably the pH is of from of 2 to 7. Reaction B is preferably carried out under weakly acidic to weakly alkaline conditions, more preferably the pH is of from 4 to 8. Reaction C is preferably carried out under weakly acidic to alkaline conditions, more preferably the pH is of from 5 to 11.

The pH of each reaction A, B and C is generally controlled by addition of a suitable base, the choice of base being dictated by the desired product composition. Preferred bases are selected from the group consisting of aliphatic tertiary amines and of hydroxides, carbonates and bicarbonates of alkali and/or alkaline earth metals and of mixtures thereof. Preferred alkali and alkaline earth metals are selected from the group consisting of lithium, sodium, potassium, calcium and magnesium. Preferred aliphatic tertiary amines are 2-[2-hydroxyethyl(methyl)amino]ethanol, 2-(dimethylamino) ethanol, triethanolamine and triisopropanolamine. Where a combination of two or more different bases is used, the bases may be added in any order, or at the same time. Preferred bases are NaOH, LiOH and KOH.

Where it is necessary to adjust the reaction pH using acid, preferable acids are selected from the group consisting of hydrochloric acid, sulphuric acid, formic acid and acetic acid.

The obtained compositions comprising the OBA of formula (1) may optionally be desalinated by membrane filtration. The membrane filtration process is preferably that of ultrafiltration. Preferably, thin-film membranes are used. Preferably, the membrane is made of polysulfone, polyvinylidenefluoride or cellulose acetate.

The present application relates further to the use of the aqueous composition according to the invention for optical brightening of a cellulosic substrate. Preferably the aqueous composition according to the invention is used in a coating composition according to the invention for optical brightening of a cellulosic substrate.

The term "cellulosic substrate" within the context of the present application refers to a substrate which comprises or consists essentially of cellulose. The cellulosic substrate can be selected from paper, board or cotton.

Preferably, the cellulosic substrate contains a web of cellulose fibers which may be synthetic or sourced from any fibrous plant including woody and non-woody sources. Preferably the cellulose fibers are sourced from hardwood and/or softwood. The fibers may be either virgin fibers or recycled fibers, or any combination of virgin and recycled fibers.

The cellulose fibers contained in the cellulosic substrate may be modified by physical and/or chemical methods as described, for example, in Chapters 13 and 15 respectively in Handbook for Pulp & Paper Technologists by G. A. Smook, $2^{nd}$ Edition Angus Wilde Publications, 1992. One example of a chemical modification of the cellulose fiber is the addition of an optical brightener as described, for example, in EP 0 884 312 A1, EP 0 899 373 A1, WO 02/055646 A1, WO 2006/061399 A2, WO 2007/017336 A1, WO 2007/143182 A2, US 2006/0185808, and US 2007/0193707.

The aqueous composition according to the invention can be applied to the cellulosic substrate in a coating composition, in particular in a pigmented coating composition. The amount of the aqueous composition present in the coating composition is in the range of 1 to 40 wt %, wherein the wt % are based on the weight of the dry white pigment.

The coating composition for the optically brightening of a cellulosic substrate comprises or consists of the aqueous composition according to the invention and can further comprise or consist of at least one pigment and/or at least one binder.

However, the use of the aqueous composition according to the invention has the advantage that no additional binder has to be used in the coating composition.

Preferably, the amount of free OBA according to formula (1) present in the coating composition according to the invention is below 10% by weight, or below 8% by weight, or below 6% by weight, or below 4% by weight, or below 2% by weight, or below the detection limit of the method described in Example 1, i.e. below 1% by weight, wherein the weight % are based on the total amount of OBA of formula (1) present in the coating composition according to the invention. Considering it the other way round, more than 90% by weight, or more than 92% by weight, or more than 94% by weight, or more than 96% by weight, or more than 98% by weight, or more than 99% by weight of the OBA of formula (1) are entrapped wherein the weight % are based on the total amount of OBA of formula (1) present in the coating composition according to the invention.

If the coating composition according to the invention is designed as pigmented coating composition, the composition comprises 10 to 70% by weight, preferably 40 to 60% by weight of white pigment(s), the weight % being based on the total weight of the pigmented coating composition. Although it is possible to produce coating compositions that are free of white pigment(s), the best white substrates for printing are made using opaque coating compositions comprising the white pigments in the afore mentioned amounts.

The white pigment is selected from inorganic pigments, preferably from the group consisting of e.g., aluminium silicates (kaolin, otherwise known as china clay), calcium carbonate (chalk), titanium dioxide, aluminium hydroxide, barium carbonate, barium sulphate, or calcium sulphate (gypsum) or mixtures thereof. Preferably a mixture 10 to 20% by weight of clay and 30 to 40% by weight of chalk is used as white pigment, the % by weight being based on the total weight of the pigmented coating composition. The term "pigment" as used within the context of the present application refers to a water insoluble compound.

In such cases where an additional binder is used in the coating composition according to the invention, the binder may be any of those commonly used in the paper industry for the production of coating compositions and may consist of a single binder or of a mixture of primary and secondary binders. The binder is selected from a primary binder comprising one or more of synthetic latex, styrene-butadiene, vinylacetate, styrene acrylic, vinyl acrylic, or ethylene vinyl acetate polymer and optionally a secondary binder comprising one or more of starch, carboxymethylcellulose, casein, soy polymer, polyvinyl alcohol.

The sole or primary binder is preferably a synthetic latex, typically a styrene-butadiene, vinyl acetate, styrene acrylic, vinyl acrylic or ethylene vinyl acetate polymer. The preferred primary binder is a latex binder.

The amount of binder and aqueous composition according to the invention used is an amount typically in the range of 2 to 25% by weight, preferably of 4 to 20% by weight, the % by weight being based on the total weight of white pigment present in the pigmented coating composition.

It is however preferred that no additional binder is used in the coating composition according to the invention. Thus, the aqueous composition according to the invention used in the coating composition according to the invention is an amount typically in the range of 2 to 25% by weight, preferably of 4 to 20% by weight, the % by weight being based on the total weight of white pigment present in the pigmented coating composition.

The secondary binder which may be optionally used may be, e.g., starch, carboxymethylcellulose, casein, soy polymers, polyvinyl alcohol or a mixture thereof. The preferred secondary binder which may be optionally used is a polyvinyl alcohol binder.

The polyvinyl alcohol which may be optionally used in the pigmented coating composition as secondary binder has preferably a degree of hydrolysis greater than or equal to 60% and a Brookfield viscosity of from 2 to 80 mPa·s (4% aqueous solution at 20° C.). More preferably, the polyvinyl alcohol has a degree of hydrolysis greater than or equal to 80% and a Brookfield viscosity of from 2 to 40 mPa·s (4% aqueous solution at 20° C.).

When optionally used, the secondary binder is used in an amount typically in the range of 0.1 to 20% by weight, preferably of 0.2 to 8% by weight, more preferably of 0.3 to 6% by weight, the % by weight being based on the total weight of white pigment, present in the pigmented coating composition.

The pH value of the coating composition according to the invention is typically in the range of 5 to 13, preferably of 6 to 11, more preferably of 7 to 10. Where it is necessary to adjust the pH of the coating composition, acids or bases may be employed. Examples of acids which may be employed include but are not restricted to hydrochloric acid, sulphuric acid, formic acid and acetic acid. Examples of bases which may be employed include but are not restricted to alkali metal and alkaline earth metal hydroxide or carbonates, ammonia or amines.

Further, the coating composition may contain by-products formed during the preparation of the OBA of formula (1) as well as other conventional additives. Examples of such additives are for example antifreezers, dispersing agents, synthetic or natural thickeners, carriers, defoamers, wax emulsions, dyes, inorganic salts, solubilizing aids, preservatives, complexing agents, biocides, cross-linkers, pigments, special resins etc.

The present application further relates to a process for optical brightening of a cellulosic substrate comprising the steps of i) applying the aqueous composition according to the invention or the coating composition according to the invention to the cellulosic substrate, and ii) drying the cellulosic substrate.

The present application also relates to the cellulosic substrate treated with the aqueous composition according to the invention or the coating composition according to the invention.

EXAMPLES

The examples are to be understood as illustrating the method and the composition according to the invention. The examples are however not to be construed as limiting the scope of the invention. If not stated otherwise, "parts" means "parts by weight".

Example 1: Determination of Free Optical Brightener Content in Aqueous Compositions The following description generally described a method on how to determine the amount of free, i.e. not entrapped optical brightener in either commonly known aqueous compositions (also referred to as latex) or aqueous compositions according to the invention.

0.50 parts of an aqueous composition are added with stirring to 40 ml of a 1% w/w aqueous solution of aluminium sulphate. After coagulation the dispersion is centrifuged at 4000 rpm for 15 minutes. 1.5 parts of the serum are diluted with 3 parts water, and the absorbance is measured by spectrophotometer against a water-containing blank. The concentration of free optical brightener in the aqueous composition is then calculated from a calibration curve.

Example 2: Preparation of an Aqueous Composition According to the Invention 290 parts demineralized water and 5 parts of an optical brightener of formula (5) were introduced into a 1-litre reactor. The stirred solution was heated to 80° C.

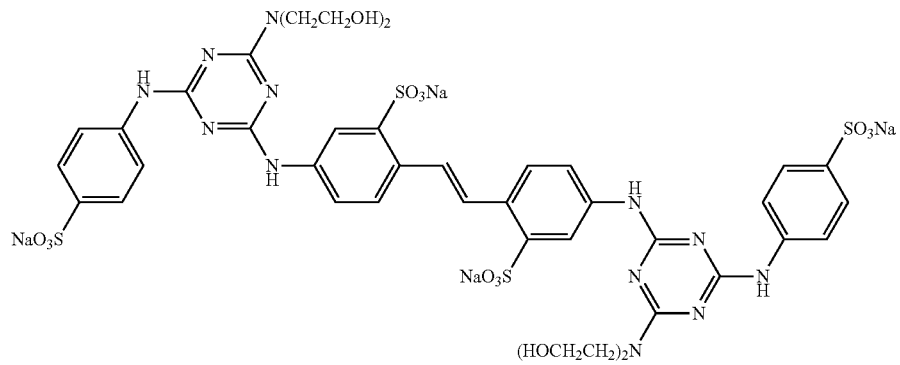

In a second vessel, a pre-dispersion was formed by stirring together 160 parts demineralized water, 3 parts lauryl sulphate sodium salt, 248 parts butyl acrylate, 226 parts styrene and 10 parts acrylic acid.

In a third vessel, 3 parts of a radical initiator of formula (6) were dissolved in 30 parts demineralized water.

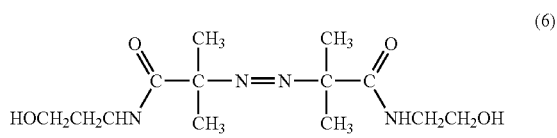

The pre-dispersion and the solution of initiator were then added to the solution of optical brightener concurrently at a stirring speed of 100 rpm and over a period of four hours while maintaining the internal temperature at 80° C.

At the end of the four hours, any residual pre-dispersion and monomer were rinsed into the reactor with a further 20 parts demineralized water, and the internal temperature was held at 80° C. for a further two hours.

The so-formed aqueous composition was allowed to cool to room temperature, and the pH adjusted to ca. 7 with 5 parts 25% ammonia solution to give 1000 parts of an aqueous composition of an optically brightened styrene-acrylate latex containing 49% dry solids and approx. 0.5% optical brightener by weight, wherein the wt % are based on the weight of the complete aqueous composition. Less than 1% by weight of the obtained latex was in the form of grits (removed by filtration) and unusable (the wt % are based on the weight of the complete aqueous composition).

The free optical brightener content, measured according to Example 1, was below the limit of detection. By mass balance, >99% of the optical brightener (5) was entrapped within the latex.

Example 3: Preparation of an Aqueous Composition According to the Invention

Example 2 was repeated using an optical brightener of formula (7) in place of the optical brightener of formula (5) to give 1000 parts of an aqueous composition of optically brightened styrene-acrylate latex containing 48% dry solids and approx. 0.5% optical brightener by weight wherein the wt % are based on the weight of the complete aqueous composition. Less than 1% by weight of the obtained latex was in the form of grits (removed by filtration) and unusable (the wt % are based on the weight of the complete aqueous composition).

The free optical brightener content, measured according to Example 1, was below the limit of detection. By mass balance, >99% of the optical brightener (7) was entrapped within the latex.

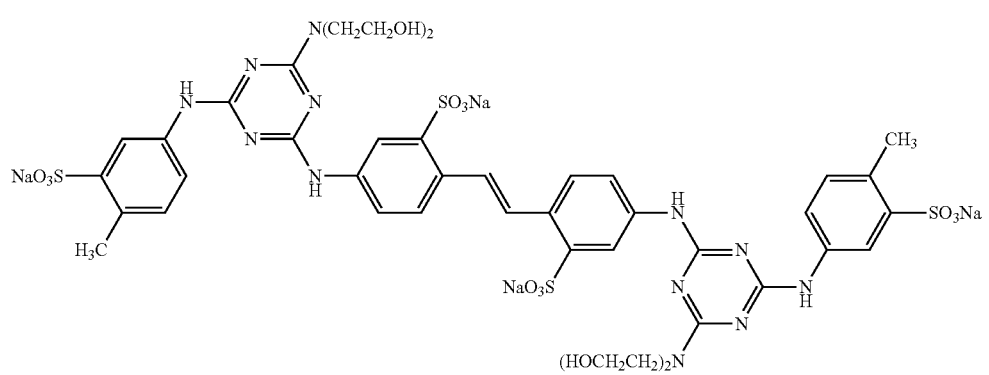

Example 4: Preparation of a Comparative Aqueous Composition

Example 2 was repeated using 5 parts of an optical brightener monomer of formula (8) in place of the optical brightener of formula (5) to give 1000 parts of an optically brightened styrene-acrylate latex containing 49.7% dry solids and approx. 0.25% optical brightener by weight. Less than 1% by weight of the obtained latex was in the form of grits (removed by filtration) and unusable (the wt % are based on the weight of the complete aqueous composition).

The free optical brightener content, measured according to Example 1, was 42%.

Archroma). The solids content of the coating composition was adjusted to approx. 65% by the addition of water, and the pH was adjusted to 8-9 with sodium hydroxide.

The coating composition was then applied to a commercial 75 gsm neutral-sized white paper base sheet using an automatic wire-wound bar applicator with a standard speed setting and a standard load on the bar. The coated paper was then dried for 5 minutes in a hot air flow. Afterwards the paper was allowed to condition and measured for CIE Whiteness and ISO Brightness on a calibrated Autoelrepho spectrophotometer.

The procedure was repeated to prepare further coated papers using coating compositions in which the commercial

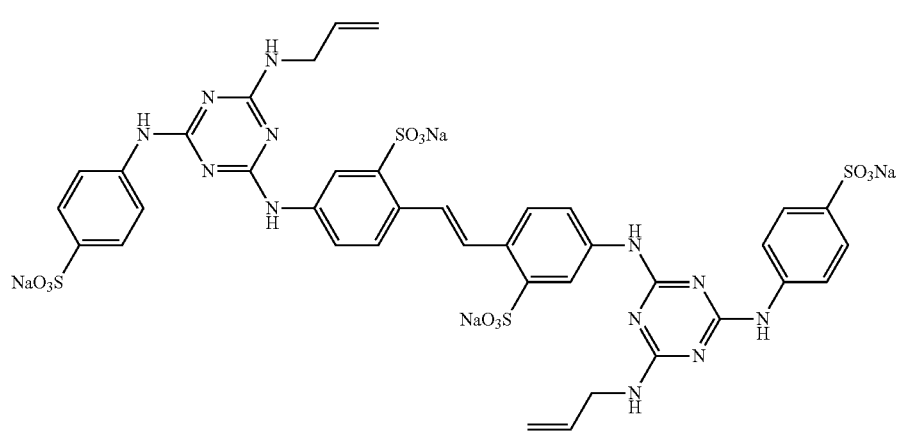

(8)

Example 5: Comparative Preparation of an Aqueous Composition Using AIBN

Example 2 was repeated using a solution of 3 parts AIBN, a radical initiator of formula (9), in 10 parts acetone, in place of the aqueous solution of the radical initiator of formula (6).

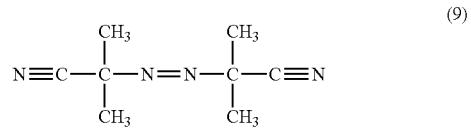

(9)

Only 750 parts of an optically brightened styrene-acrylate latex containing 40% dry solids was obtained (approx. 60% yield). More than 20% by weight of the obtained latex was in the form of grits (removed by filtration) and unusable (the wt % are based on the weight of the complete aqueous composition).

The free optical brightener content, measured according to Example 1, was 82%.

Example 6: Application Example

A coating composition was prepared containing 70 parts chalk (commercially available under the trade name Hydrocarb 55 from OMYA), 30 parts clay (commercially available under the trade name Polygloss 90 from KaMin), 49.5 parts water, 0.6 parts dispersing agent (commercially available under the trade name Topsperse GX-N from Coatex), and 20 parts of 50% latex (a styrene acrylate copolymer commercially available under the trade name Cartacoat B631 from latex was incrementally replaced with 25% by weight, 50% by weight, 75% by weight and 100% by weight of the aqueous composition according to the invention prepared in Example 2, wherein the weight % are based on the complete weight of the coating composition.

The results are shown in Table 1 and clearly show that the aqueous composition according to the invention provides high levels of CIE Whiteness and ISO Brightness without saturation.

TABLE 1

| Commercial latex | Latex of Example 2 | CIE Whiteness | ISO Brightness |
|---|---|---|---|
| 100% | 0% | 74.8 | 85.4 |
| 75% | 25% | 84.7 | 88.7 |
| 50% | 50% | 88.3 | 90.1 |
| 25% | 75% | 91.5 | 91.2 |
| 0% | 100% | 93.4 | 91.9 |

Example 7: Application Example

Example 7 was repeated with the sole difference that the aqueous composition according to the invention prepared in Example 3 is used.

The results are shown in Table 2.

TABLE 2

| Commercial latex | Latex of Example 3 | CIE Whiteness | ISO Brightness |
|---|---|---|---|
| 100% | 0% | 74.8 | 85.4 |
| 75% | 25% | 83.8 | 88.4 |
| 50% | 50% | 87.4 | 89.8 |

TABLE 2-continued

| Commercial latex | Latex of Example 3 | CIE Whiteness | ISO Brightness |
|---|---|---|---|
| 25% | 75% | 90.2 | 90.7 |
| 0% | 100% | 91.5 | 91.3 |

The invention claimed is:

1. A Method for preparation of an aqueous composition, optionally of a water-based latex binder, comprising emulsion polymerization of at least one ethylenically unsaturated monomer in the presence of at least one water-soluble diaminostilbene disulphonic optical brightener of formula (1)

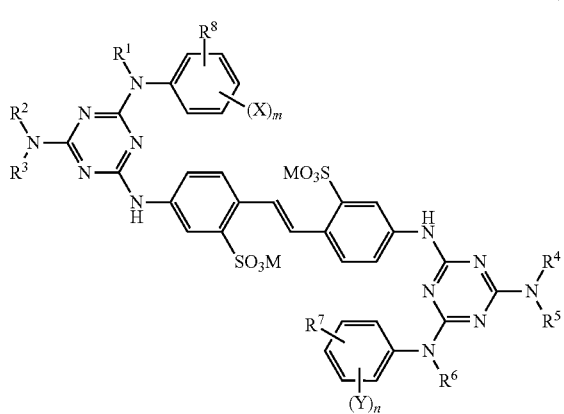

in which
- $R^1$ and $R^6$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$,
- $R^2$ and $R^4$ signify independently from each other hydrogen, linear or branched $C_1$ to $C_4$ alkyl, linear or branched $C_1$ to $C_4$ hydroxyalkyl, $CH_2CO_2M$, $CH_2CH_2CONH_2$ or $CH_2CH_2CN$,
- $R^3$ and $R^5$ signify independently from each other linear or branched $C_1$ to $C_4$ alkyl, linear or branched $C_1$ to $C_4$ hydroxyalkyl, $CH_2CO_2M$, $CH(CO_2M)CH_2CO_2M$, $CH(CO_2M)CH_2CH_2CO_2M$, benzyl or
- $R^2$ and $R^3$ signify together with their neighbouring nitrogen atom a morpholino ring and/or
- $R^4$ and $R^5$ signify together with their neighbouring nitrogen atom a morpholino ring,
- $R^7$ and $R^8$ signify independently from each other hydrogen, linear or branched $C_1$ to $C_4$ alkyl
- X and Y signify independently from each other $CO_2M$ or $SO_3M$,
- n and m signify independently from each other an integer selected from 0, 1 or 2, and
- M signifies at least one cation for balancing anionic charge of the optical brightener and is selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetra-substituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

2. Method according to claim 1, wherein in the at least one water-soluble diaminostilbene disulphonic optical brightener of formula (1)
- $R^1$ and $R^6$ signify independently from each other hydrogen, methyl, linear or branched $C_1$ to $C_4$ hydroxyalkyl or $CH_2CH_2CONH_2$,
- $R^2$ and $R^4$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$,
- $R^3$ and $R^5$ signify independently from each other linear or branched $C_1$ to $C_4$ alkyl, linear or branched $C_1$ to $C_4$ hydroxyalkyl, $CH(CO_2M)CH_2CO_2M$, $CH(CO_2M)CH_2CH_2CO_2M$, benzyl or
- $R^2$ and $R^3$ signify together with their neighbouring nitrogen atom a morpholino ring and/or
- $R^4$ and $R^5$ signify together with their neighbouring nitrogen atom a morpholino ring, and
- $R^7$ and $R^8$ signify independently from each other hydrogen or methyl.

3. Method according to claim 1, wherein in the at least one water-soluble diaminostilbene disulphonic optical brightener of formula (1)
- $R^1$ and $R^6$ signify hydrogen,
- $R^2$ and $R^4$ signify independently from each other hydrogen, linear or branched $C_1$ to $C_2$ alkyl, linear or branched $C_1$ to $C_3$ hydroxyalkyl,
- $R^3$ and $R^5$ signify independently from each other linear or branched $C_1$ to $C_2$ alkyl, linear or branched $C_1$ to $C_3$ hydroxyalkyl, $CH(CO_2M)CH_2CO_2M$, $CH(CO_2M)CH_2CH_2CO_2M$, or
- $R^2$ and $R^3$ signify together with their neighbouring nitrogen atom a morpholino ring and/or
- $R^4$ and $R^5$ signify together with their neighbouring nitrogen atom a morpholino ring, and
- $R^7$ and $R^8$ signify independently from each other hydrogen or methyl.

4. Method according to claim 1, wherein the at least one ethylenically unsaturated monomer is selected from (a) $C_1$- to $C_{18}$-alkyl esters of (meth)acrylic acid, vinyl acetate, vinyl propionate, vinyl butyrate, vinyl versatates, styrene and α-methylstyrene; (b) hydrophilic monomers optionally (meth)acrylic acid, itaconic acid, vinylsulphonic acid, $C_1$- to $C_8$-hydroxyalkylesters of $C_1$- to $C_6$-carboxylic acids, (meth)acrylamide, N-methylol(meth)acrylamide, (meth)acrylonitrile, N-vinylformamide and N-vinylpyrrolidone; or (c) crosslinking agents which have two or more ethylenically-unsaturated double bonds optionally ethylene glycol di(meth)acrylate, butanediol di(meth)acrylate, hexanediol di(meth)acrylate, divinylbenzene and trivinylbenzene; or a mixture of two or more thereof.

5. Method according to claim 1, wherein the at least one ethylenically unsaturated monomer is selected from (a) $C_1$- to $C_6$-alkyl esters of (meth)acrylic acid, vinyl acetate, vinyl propionate and styrene; (b) hydrophilic monomers optionally (meth)acrylic acid, vinylsulphonic acid, (meth)acrylamide and (meth)acrylonitrile; or a mixture of two or more thereof.

6. Method according to claim 1, wherein the at least one ethylenically unsaturated monomer is selected from (a) methyl methacrylate, butyl acrylate, vinyl acetate and styrene; (b) hydrophilic monomers optionally (meth)acrylic acid, vinylsulphonic acid and acrylamide; or a mixture of two or more thereof.

7. Method according to at claim 1, wherein the emulsion polymerization is initiated by a water-soluble azo compound of formula (2) and/or formula (3)

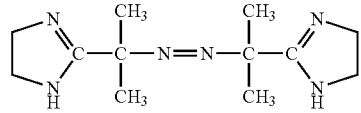

(2)

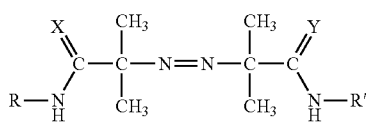

(3)

in which

X and Y signify independently from each other O or NH,

R and R' signify independently from each other hydrogen, or linear or branched $C_1$-$C_4$ alkyl substituted with one or more hydroxyl, $CO_3M^1$ or $CO_3M^2$ groups, wherein $M^1$ and $M^2$ signify at least one cation for balancing the anionic charge of the azo compound of formula (3) and are independently from each other selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

8. Method according to claim 1, wherein the emulsion polymerization comprises at least the following four steps (a) to (d):

a) providing an aqueous solution comprising or consisting of the at least one water-soluble diaminostilbene disulphonic optical brightener of formula (1), and optionally at least one dispersing agent and b) providing a homogeneous pre-dispersion, wherein the pre-dispersion comprises or consists of the at least one ethylenically unsaturated monomer, water and at least one dispersing agent, and c) providing an aqueous solution comprising or consisting of a water-soluble azo compound of formula (2) and/or formula (3), and d) adding the pre-dispersion obtained in (b) and the aqueous solution obtained in (c) concurrently to the aqueous solution obtained in (a).

9. Aqueous composition obtainable by a method for preparation of an aqueous composition, optionally of a water-based latex binder, comprising emulsion polymerization of at least one ethylenically unsaturated monomer in the presence of at least one water-soluble diaminostilbene disulphonic optical brightener of formula (1)

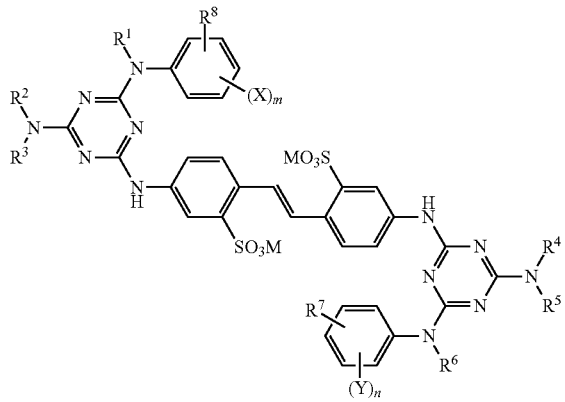

(1)

in which $R^1$ and $R^6$ signify independently from each other hydrogen, linear or branched $C_1$ to $C_4$ alkyl, linear or branched $C_1$ to $C_4$ hydroxyalkyl, $CH_2CH_2CONH_2$ or $CH_2CH_2CN$, $R^2$ and $R^4$ signify independently from each other hydrogen, linear or branched $C_1$ to $C_4$ alkyl, linear or branched $C_1$ to $C_4$ hydroxyalkyl, $CH_2CO_2M$, $CH_2CH_2CONH_2$ or $CH_2CH_2CN$, $R^3$ and $R^5$ signify independently from each other linear or branched $C_1$ to $C_4$ alkyl, linear or branched $C_1$ to $C_4$ hydroxyalkyl, $CH_2CO_2M$, $CH(CO_2M)CH_2CO_2M$, $CH(CO_2M)CH_2CH_2CO_2M$, benzyl or $R^2$ and $R^3$ signify together with their neighbouring nitrogen atom a morpholino ring and/or $R^4$ and $R^5$ signify together with their neighbouring nitrogen atom a morpholino ring, $R^7$ and $R^8$ signify independently from each other hydrogen, linear or branched $C_1$ to $C_4$ alkyl X and Y signify independently from each other $CO_2M$ or $SO_3M$, n and m signify independently from each other an integer selected from 0, 1 or 2, and M signifies at least one cation for balancing anionic charge of the optical brightener and is selected from the group comprising or essentially consisting of hydrogen, an alkali metal cation, an alkaline earth metal cation, ammonium, ammonium which is mono-, di-, tri- or tetrasubstituted by a $C_1$ to $C_4$ linear or branched alkyl radical, ammonium which is mono-, di-, tri- or tetrasubstituted by a $C_1$ to $C_4$ linear or branched hydroxyalkyl radical, ammonium which is di-, tri-, or tetrasubstituted by a mixture of $C_1$ to $C_4$ linear or branched alkyl radical or $C_1$ to $C_4$ linear or branched hydroxyalkyl radical or mixtures of said cations.

10. Aqueous composition according to claim 9, wherein at least one further additive is present in the aqueous composition, wherein the additive is selected from, one or more biocides, one or more defoamers, one or more preservatives, one or more antifreezers, one or more thickeners, or mixtures thereof.

11. Aqueous composition according to claim 9, wherein more than 90% by weight, or more than 92% by weight, or more than 94% by weight, or more than 96% by weight, or more than 98% by weight, or more than 99% by weight of the OBA of formula (1) are entrapped within the polymer wherein the weight % are based on the total amount of OBA of formula (1) present in the aqueous composition.

12. A product comprising the aqueous composition according to claim 9 for optically brightening of a cellulosic substrate, optionally wherein the aqueous composition is adapted for a coating composition.

13. Coating composition comprising at least the aqueous composition according to claim 9.

14. Process for optical brightening of a cellulosic substrate comprising i) applying the aqueous composition according to claim 9 or a coating composition thereof to the cellulosic substrate, and ii) drying the cellulosic substrate.

15. Cellulosic substrate treated with the aqueous composition as claimed in claim 9 or a coating composition thereof.

* * * * *